(12) United States Patent
Murakami et al.

(10) Patent No.: US 7,054,546 B2
(45) Date of Patent: May 30, 2006

(54) DATA MULTIPLEXING METHOD, DATA RECORDED MEDIUM, DATA RECORDING APPARATUS AND DATA RECORDING PROGRAM

(75) Inventors: Tomokazu Murakami, Tokyo (JP); Masahiro Kageyama, Hino (JP); Hisao Tanabe, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1048 days.

(21) Appl. No.: 09/942,717

(22) Filed: Aug. 31, 2001

(65) Prior Publication Data

US 2003/0021298 A1    Jan. 30, 2003

(30) Foreign Application Priority Data

Jul. 30, 2001    (JP)    ............................. 2001-230439

(51) Int. Cl.
  *H04N 5/91*    (2006.01)
(52) U.S. Cl. .......................................... 386/98; 386/52

(58) Field of Classification Search ................. 386/39, 386/45, 46, 52, 54, 96, 98, 125
See application file for complete search history.

(56) References Cited

FOREIGN PATENT DOCUMENTS

| JP | 11-346348 | 12/1999 |
|---|---|---|
| JP | 2000-195188 | 7/2000 |
| JP | 2000-197001 | 7/2000 |

*Primary Examiner*—James Groody
*Assistant Examiner*—Mishawn Dunn
(74) *Attorney, Agent, or Firm*—Mattingly, Stanger, Malur & Brundidge, P.C.

(57) ABSTRACT

To ensure seamless reproduction of video data and audio data even when the video data and audio data are edited video object unit by video object unit in multiplexing of the video data and audio data, a playback time of the video data is compared with that of the audio data and packets are multiplexed in such a way that a video packet and an audio packet to be reproduced within a given timing range are included in the same video object unit.

12 Claims, 13 Drawing Sheets

PRIOR ART

FIG. 3
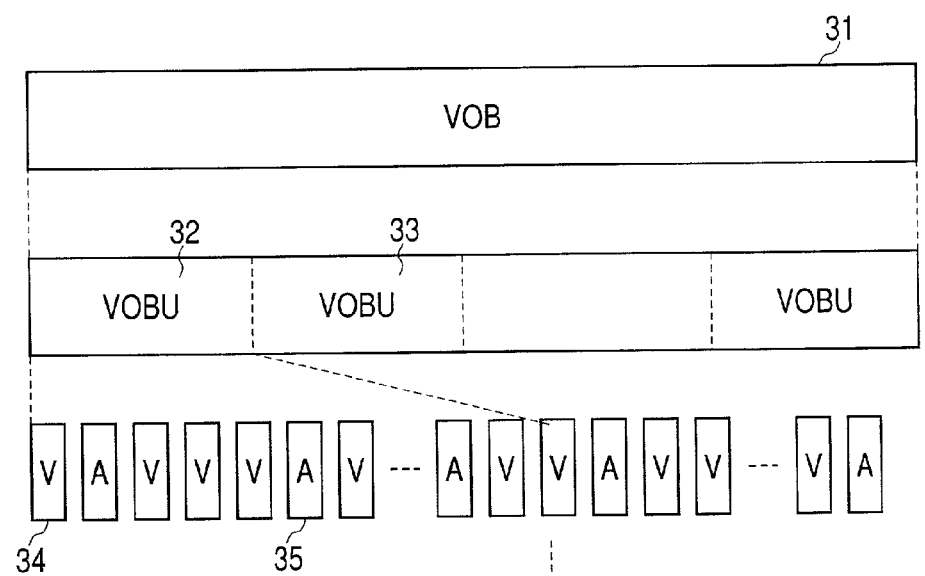
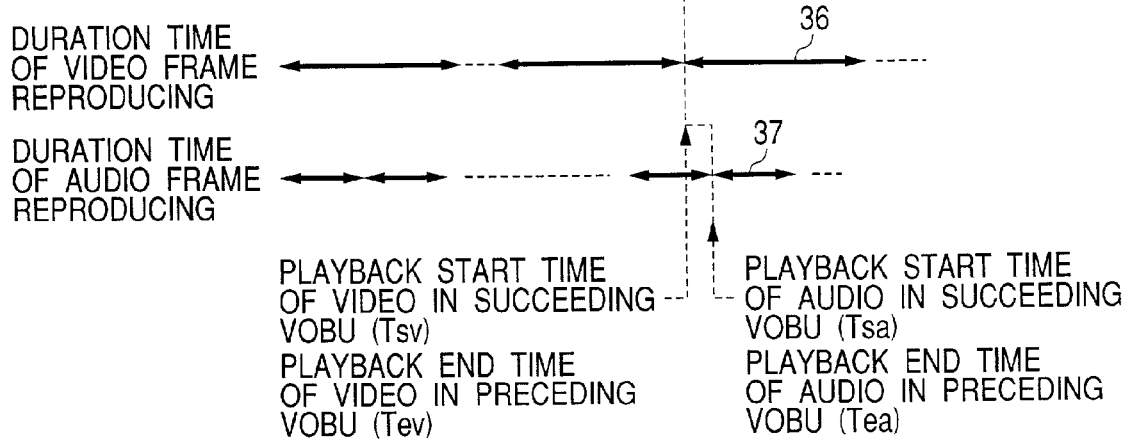
DURATION TIME OF VIDEO FRAME REPRODUCING
DURATION TIME OF AUDIO FRAME REPRODUCING
PLAYBACK START TIME OF VIDEO IN SUCCEEDING VOBU (Tsv)
PLAYBACK END TIME OF VIDEO IN PRECEDING VOBU (Tev)
PLAYBACK START TIME OF AUDIO IN SUCCEEDING VOBU (Tsa)
PLAYBACK END TIME OF AUDIO IN PRECEDING VOBU (Tea)

DATA MULTIPLEXING METHOD, DATA RECORDED MEDIUM, DATA RECORDING APPARATUS AND DATA RECORDING PROGRAM

BACKGROUND OF THE INVENTION

The present invention relates to a data multiplexing method, a data recorded medium, a data recording apparatus and a program describing a recording method, and, more particularly, to a data recorded medium for multimedia data, a data recording apparatus and a stream recording method all of the MPEG system or the like.

As schemes for recording and transferring a vast amount of picture and voice information as digital data, encoding systems, such as the MPEG (Moving Picture Experts Group) system, have been established and become international standards of encoding, such as the ISO/IEC 11172 and ISO/IEC 13818. Those systems are used as encoding systems for digital satellite broadcasting, DVD and so forth.

Due to the development on digital video cameras and the appearance of large-capacity recording media, such as DVD-RAM and DVD-RW, there are growing demands for processing of digitally recorded pictures and voices and studies and development on fast retrieval, analysis and edition of such digital data are underway.

The MPEG system is explained below as one example. ISO/IEC 13818 (hereinafter referred to as "MPEG-2") includes ISO/IEC 13818-1 (hereinafter called "system standard"), ISO/IEC 13818-2 (hereinafter called "video standard") and ISO/IEC 13818-3 (hereinafter called "audio standard"). A data stream of the video standard and a data stream of the audio standard are multiplexed according to the system standard. According to the video standard and audio standard, picture and voice information are structured according to their encoding units and are detected by specific start codes and synchronization data. The system standard can multiplex not only video and audio information but also a parameter for an encoder and information, such as a data arrangement in a recording medium. Other systems than the MPEG audio standard can also be used in audio encoding.

At the time of multiplexing the aforementioned data streams for transfer and recording, the system standard divides each of the streams that conforms to the video standard and the audio standard by an adequate length to yield data blocks, adds headers to the data blocks to produce packets and multiplexes the data streams packet by packet. A packet consists of a header and a payload. Recorded in the header are information for video and audio synchronization and flags indicating the characteristic of data. A data stream of video, audio or the like is recorded in the payload. Packets according to MPEG-2 include a pack, a PES (Packetized Elementary Stream) packet, and a TS (Transport Stream) packet. As a data stream is divided into packets of an adequate length before being multiplexed, recording, transfer and reproduction of data can be performed efficiently. Time information, namely an SCR (System Clock Reference) and PCR (Program Clock Reference), recorded in the header is used as a read time for a buffer by the decoder and as information for synchronization of clocks for the encoder and decoder. Time information, such as a PTS (Presentation Time Stamp) and DTS (Decoding Time Stamp), is used as information for synchronization of video playback and audio playback. Based on the playback time information, the decoder reproduces streams of video, audio and so forth in synchronism with each other.

While video data is encoded picture by picture, it is handled with a unit of motion compensation or a group of pictures (GOP) consisting of a plurality of pictures as a unit in executing edition or the like. Audio data is encoded audio access unit (AAU) by AAU. In general, video data and audio data are independently packetized and multiplexed. Edition of a multiplexed data stream (multiplexed stream) is carried out video object unit (VOBU) by VOBU which is a unit consisting of a series of packets from a packet including the head of a GOP to a packet including the head of a next GOP. Because a video stream and an audio stream are stored in respective buffers in case where the multiplexed stream is separated into the video stream and audio stream for reproduction on the decoder side, video packets and audio packets are multiplexed at timings suitable for the associated buffers.

According to the conventional data multiplexing method of this type, for a video packet and an audio packet which have the same playback time, the video packet is multiplexed first in a multiplexed stream, followed by multiplexing of the audio packet with some delay. At the head and end of a VOBU, therefore, a video packet and an audio packet which include data to be reproduced at the same time are included in separate VOBUs.

This is described below more specifically. According to the conventional multiplexed stream, as shown in FIG. 2, each video packet 22 and each audio packet 23 are multiplexed at timings suitable for the respective buffers, so that the video packet 22 and audio packet 23 which are to be reproduced at the same time are stored in separate VOBUs near VOBU boundaries, such as the head and end of a VOBU. When such a multiplexed stream 21 is edited VOBU by VOBU, the edited stream is reproduced with intermittent voices, not in a seamless manner.

In case where a multiplexed stream is divided at a VOBU boundary 24 and a preceding VOBU is to be deleted, for example, an audio frame 26 of interest is multiplexed at a position of an audio packet 23 included in the preceding VOBU. When the preceding VOBU is deleted, therefore, the audio frame that should be reproduced at the same time as a video frame 25 included in the succeeding VOBU is lost. This raises a problem of intermittent voices at the time the succeeding VOBU is reproduced. This occurs because time stamps of the video packet 22 and the audio packet 23 are not compared with each other at the time of multiplexing.

In short, when VOBU-by-VOBU edition, such as partial deletion or changing the reproducing order, is performed on a multiplexed stream which has been multiplexed according to the prior art method, part of video data or audio data that should be reproduced at the same time is lost, resulting in intermittent voices or the like. This disables the proper reproduction of edited data. To perform edition on this multiplexed stream in such a way as to guarantee seamless reproduction, it is necessary to perform remultiplexing after checking the playback time packet by packet, not VOBU-by-VOBU edition, which leads to a vast amount of data processing and requires a very large editing apparatus.

SUMMARY OF THE INVENTION

Accordingly, it is an object of the invention to provide a data multiplexing method that causes video data and audio data which will be reproduced within a given timing range at the time of multiplexing video packets and audio packets to be multiplexing in the same VOBU so that seamless reproduction is possible even after a multiplexed stream is edited VOBU by VOBU, and to provide a packetized stream which is generated based on the data multiplexing method, a data recording apparatus for generating the packetized stream, a program which describes a data packetizing system and a decoder capable of reproducing the packetized stream.

To achieve the above object, according to the invention, there is provided a data multiplexing method which acquires a multiplexed stream by dividing each of a video stream and an audio stream to be multiplexed into data blocks, adding headers to the data blocks to produce packets and multiplexing the packets, and wherein multiplexing is executed in such a way that a difference of playback start time or a difference of playback end time of video and audio included in a specific one of VOBUs each having a series of packets including at least one GOP becomes equal to or smaller than a threshold or equal to or smaller than an integer multiple of a duration time of reproduction of an AAU.

To execute the data multiplexing method of the invention, a data recording apparatus according to the invention, which divides each of a plurality of streams including a video stream and an audio stream into data blocks, adds headers to the data blocks to produce packets, multiplexes the packets and records the multiplexed packets, comprises first buffer means for storing the video stream to be multiplexed; second buffer means for storing the audio stream to be multiplexed; a control section for comparing the video stream from the first buffer means with the audio stream from the second buffer means to determine an order of packets and a parameter in such a way that a difference of playback start time or a difference of playback end time of video and audio to be recorded in a same video object unit in a multiplexed stream to be outputted becomes equal to or smaller than a threshold and outputting the parameter; and a multiplexing section for dividing the video stream from the first buffer means and the audio stream from the second buffer means into data blocks in accordance with the parameter and adding headers to the data blocks to produce packets, multiplexing the packets and outputting a multiplexed stream.

The data recording apparatus according to the invention is preferably realized by a computer that has a program memory where a program for executing the data multiplexing method is loaded and an arithmetic unit which stores a video stream and an audio stream to be multiplexed into process memories in accordance with the program and executes processing steps of the program.

Specifically, the program that executes the data multiplexing method comprises a step of storing the video stream and the audio stream in buffers; a step of comparing the video stream and audio stream with each other to determine a multiplexing timing in such a way that a difference of playback start time or a difference of playback end time of video and audio to be recorded in a same video object unit in a multiplexed stream to be outputted becomes equal to or smaller than a threshold and outputting the parameter; and a step of multiplexing video packets and audio packets in accordance with the multiplexing timing and outputting a multiplexed stream.

A data recorded medium on which a stream multiplexed by the data multiplexing method and the data recording apparatus of the invention is recorded and wherein the multiplexed stream includes a video stream and an audio stream and is acquired by dividing each of the video stream and the audio stream into data blocks, adding headers to the data blocks to produce packets and multiplexing the packets, and is multiplexed in such a way that a difference of playback start time or a difference of playback end time of video and audio included in a specific one of VOBUs each having a series of packets including at least one GOP, which is a video encoding unit in the video stream, becomes equal to or smaller than a threshold.

A decoder according to the invention comprises a video decoding section and an audio decoding section for receiving a multiplexed stream multiplexed by the data multiplexing method of the invention or a multiplexed stream from the data recorded medium of the invention, respectively separating the multiplexed stream into a video stream and an audio stream and respectively reproduces video data and audio data. The audio decoding section has an audio buffer for buffering the separated audio stream and an audio decoder for reproducing audio data from the audio stream. The size (capacity) of the audio buffer is set equal to or larger than a value obtained by adding a maximum value of a delay time of a picture in the video stream in the multiplexed stream with respect to a video buffering verifier and a playback time of one frame of the video stream together and multiplying a resultant value by a maximum bit rate of the audio stream.

The invention can generate such a multiplexed stream as to ensure seamless reproduction without intermittent voices even after the multiplexed stream is edited VOBU by VOBU, by comparing playback times of video data and audio data with each other and adjusting the playback times, at the time of multiplexing video packets and audio packets, in such a way that video data and audio data that are to be reproduced within a given timing range should always be multiplexed in the same VOBU. This can allow advanced edition of a multiplexed stream to be performed easily, and can simplify an editing apparatus, thus leading to a reduced circuit scale thereof.

This and other advantages of the present invention will become apparent to those skilled in the art on reading and understanding the following detailed description with reference to the accompanying figures.

BRIEF DESCRIPTION OF THE DRAWINGS

FIG. 3 shows a time chart of another embodiment of a multiplexed stream which is generated by the data multiplexing method according to the invention;

DETAILED DESCRIPTION OF THE PREFERRED EMBODIMENTS

Preferred embodiments of the invention are described below with reference to the accompanying drawings.

Figure 1:
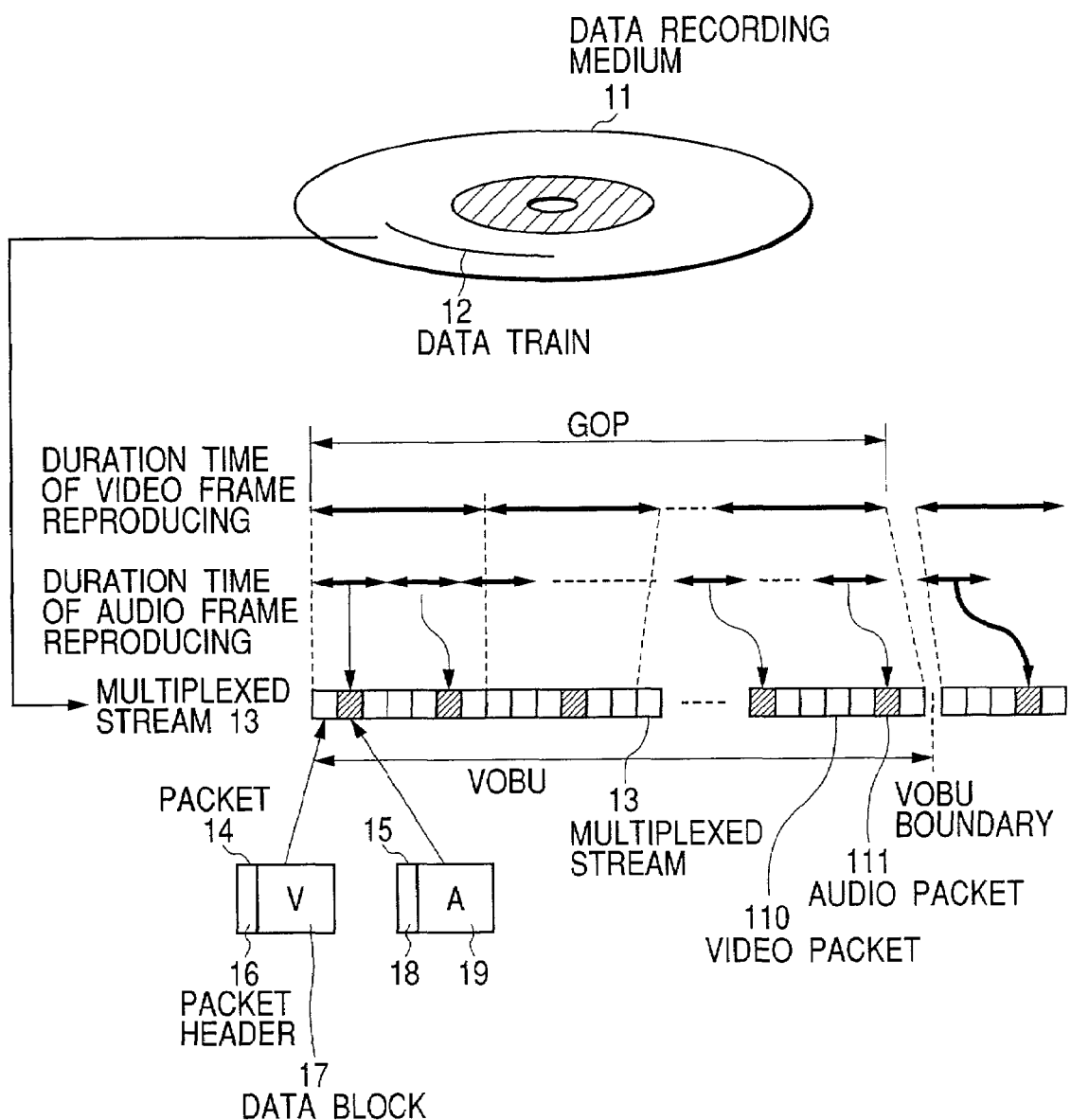
FIG. 1 shows a time chart of one embodiment of a multiplexed stream which is generated by a data multiplexing method according to the invention.
Figure 2:
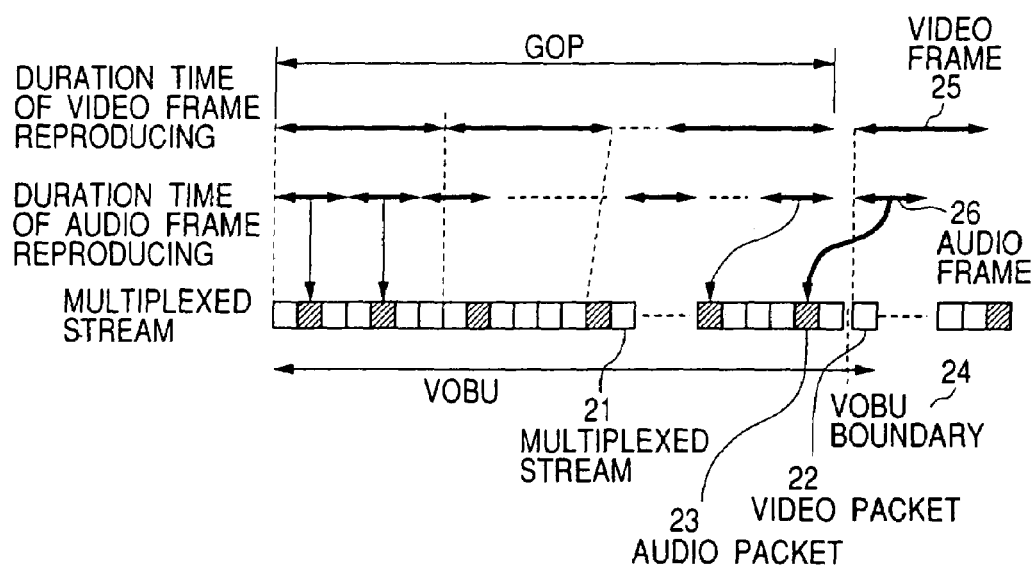
FIG. 2 is an explanatory diagram of a multiplexed stream according to the prior art system.

FIG. 1 shows a time chart of one embodiment of a multiplexed stream which is generated by a data multiplexing method according to the invention.

A data train 12 to be recorded on a data recorded medium 11 according to the invention is a multiplexed stream 13 which contains a sequence of packets 14, 15, etc. According to the embodiment, a program stream (PS) as defined by MPEG-2 is used as the multiplexed stream 13, and a video elementary stream (video ES) and an audio elementary stream (audio ES) as defined by MPEG-2 are used as input streams. In the illustrated example, a pack in the MPEG-2 PS corresponds to a packet.

A pack includes a pack header, a system header, a PES packet and a padding packet. In the example, one pack includes a single PES packet and the pack header and the PES packet header together are described as a packet header 16, 18 or the like. A packet 14 consists of the packet header 16 and a data block 17, and a packet 15 consists of the packet header 18 and a data block 19. As buffer timing information, SCR, PTS, DTS, etc. are recorded in the packet headers 16 and 18. SCR indicates a time at which a packet is read into a buffer of a decoder, and PTS and DTS indicate information about playback times of a picture and AAU, respectively.

A video ES and audio ES are respectively recorded in the data blocks 17 and 19 of the packets 14 and 15. Video consists of a series of video frames each of which is converted to units of data called pictures by MPEG-2 or the like. A given number of pictures form a unit of encoding called GOP. Audio consists of a series of audio frames each of which is converted to units of data called AAUs according to a voice encoding system. One example of a video frame is an MPEG-2 picture. One example of an audio frame is an AAU or the like according to MPEG-1 Audio or linear PCM.

Generally, the playback time of a video frame differs from that of an audio frame. The multiplexed stream 13 that is generated by the invention is multiplexed in such a way that the playback start time of a GOP in a video stream is compared with the playback start time of an AAU in an audio stream and video data and audio data whose playback time ranges lie within a given timing range are included in the same VOBU. Particularly, multiplexing is carried out in such a way that the playback start times of video data and audio data that are included in the same VOBU are compared with each other and a difference between the playback start times becomes small enough for a person not to feel a deviation between video and audio. It is preferable that the difference becomes equal to or smaller than an integer multiple of the duration time of reproduction of an AAU.

In case where a difference of playback start time of video and audio is minimized, the difference becomes equal to or smaller than a duration time of reproduction of an AAU. This is accomplished by determining the multiplexing timing based on a result of comparing the playback times of video and audio with each other or the time stamps of a video packet 110 and an audio packet 111 with each other. This multiplexed stream has a stream structure that can be reproduced in a seamless manner without intermittent voices even when edition is performed VOBU by VOBU. The details of the data multiplexing method of the invention will be discussed later.

FIG. 3 shows a time chart of another embodiment of a multiplexed stream which is generated by the invention.

Video contents are managed in units called video objects (VOBS) as shown in FIG. 3. Each VOB 31 consists of a plurality of consecutive VOBUs 32, 33 and so forth. Each VOBU includes video packets 34 and audio packets 35. At the time of reproduction, each of video frames 36 and audio frames 37 is divided into packets and multiplexed in such a way as not to be arranged over a plurality of VOBUs. According to the multiplexed stream of the embodiment, packets are produced in such a way that the difference of playback start time between the first video frame 36 and the first audio frame 37 becomes small enough for a person not to feel a deviation between video and audio, and are then multiplexed. It is preferable that multiplexing is carried out in such a way that the difference becomes equal to or smaller than an integer multiple of the duration time of reproduction of the audio frame (AAU). At the time of multiplexing video packets and audio packets, the playback time of each packet is checked and a playback start time Tsv of video in a VOBU and a playback start time Tsa of audio in that VOBU are controlled in such a way that the absolute value of the difference between Tsv and Tsa, |Tsv−Tsa|, does not exceed a threshold Tth as expressed by an equation 1. Alternatively, a playback end time Tev of video in a VOBU and a playback end time Tea of audio in that VOBU are controlled in such a way that the absolute value of the difference between Tev and Tea, |Tev−Tea|, does not exceed the threshold Tth as expressed by an equation 2.

$$|Tsv-Tsa| \leq Tth \qquad (1)$$

$$|Tev-Tea| \leq Tth \qquad (2)$$

The threshold Tth is preferably an integer multiple of the duration time of reproduction of the AAU.

Figure 4:
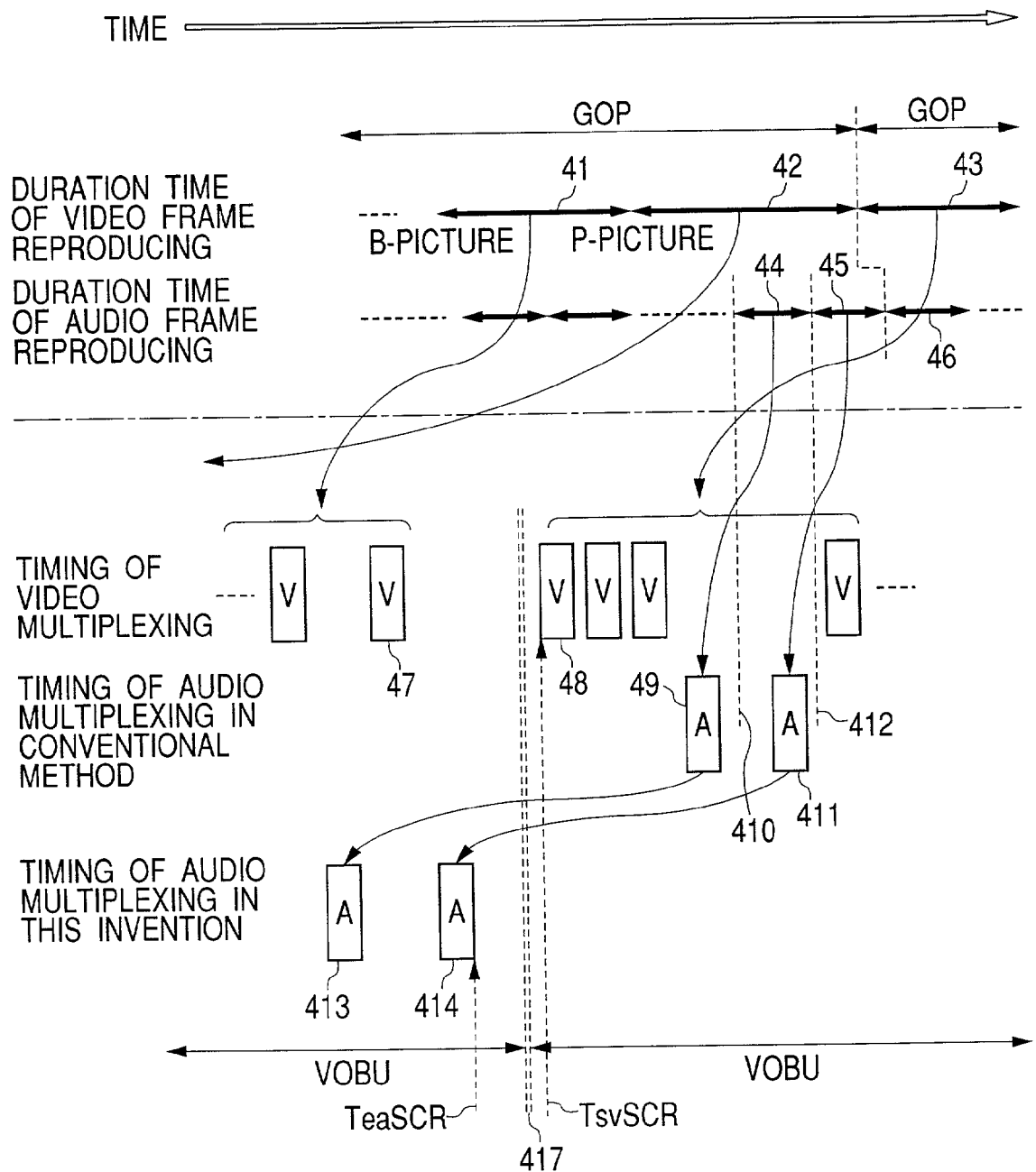
FIG. 4 shows a time chart for explaining the data multiplexing method according to the invention.

FIG. 4 shows a time chart for explaining the data multiplexing method according to the invention.

The data multiplexing method of the invention is described below with the playback times of a video frame and an audio frame and the multiplexing timing for an audio packet arranged on the same time axis as illustrated in the figure. To simplify the explanation, it is assumed that, as one example, packetization and multiplexing are carried out with one GOP corresponding to one VOBU. With regard to video, the boundary between consecutive video frames 42 and 43 is set to a GOP boundary. The different frames of those GOPs are multiplexed as separate VOBUs.

With regard to audio, the playback times of each video frame and audio frame are compared with each other and the boundary between an audio frame 45 and an audio frame 46 whose playback start time is the closest to the playback start time of the first video frame 43 of a succeeding GOP is set to a VOBU boundary. The above setting minimizes the difference of playback start time of video and audio in a VOBU after multiplexing.

Next, the video data and audio data are packetized and then multiplexed. For MPEG-2 video, when the video frame 41 is a B-picture and the video frame 42 is a P-picture, for example, data arrangements and playback times are reversed so that data of the video frame 41 becomes video data multiplexed at the end of a preceding VOBU. As the boundary between VOBUs in a multiplexed stream is determined with video taken as a reference, the boundary between a last video packet 47 in a preceding VOBU and a first video packet 48 in a succeeding VOBU becomes a VOBU boundary 417 in the multiplexed stream. According to the conventional data multiplexing system, video and audio are multiplexed at independent timings. Because the audio frames 44 and 45, for example, have only to be inputted to the buffer before playback start times 410 and 412 of those frames, therefore, the audio frames 44 and 45 are multiplexed at such timings of audio packets 49 and 411. According to the conventional data multiplexing system, however, when edition takes place at the VOBU boundary 417, the video frame 42 and the audio frames 44 and 45 that should be reproduced at the same timing are arranged in separate VOBUs and cannot be reproduced synchronously.

According to the embodiment, the audio frames 44 and 45 are multiplexed at timings 413 and 414 in consideration of the relationship with video data. Therefore, video and audio that should be reproduced within a given timing range are multiplexed in the same VOBU, so that seamless reproduction is possible even after edition is performed VOBU by VOBU. The multiplexed stream is decoded by a decoder or a multimedia data reproducing apparatus which is designed in such a way that the multiplexed stream is read in a decoder buffer packet by packet and is outputted at a playback time picture by picture and AAU by AAU. The decoder will be discussed later.

With regard to the AAU 45 that has a playback end time closest to the playback end time of the last video frame 42 of a preceding GOP, a read end time of reading a packet 414 including last data of the AAU 45 into the buffer is TeaSCR. Meanwhile, a read start time of reading a head packet of a succeeding VOBU into the buffer is TsvSCR. The multiplexed stream of the embodiment satisfies TeaSCR≦TsvSCR at the VOBU boundary.

Figure 5:
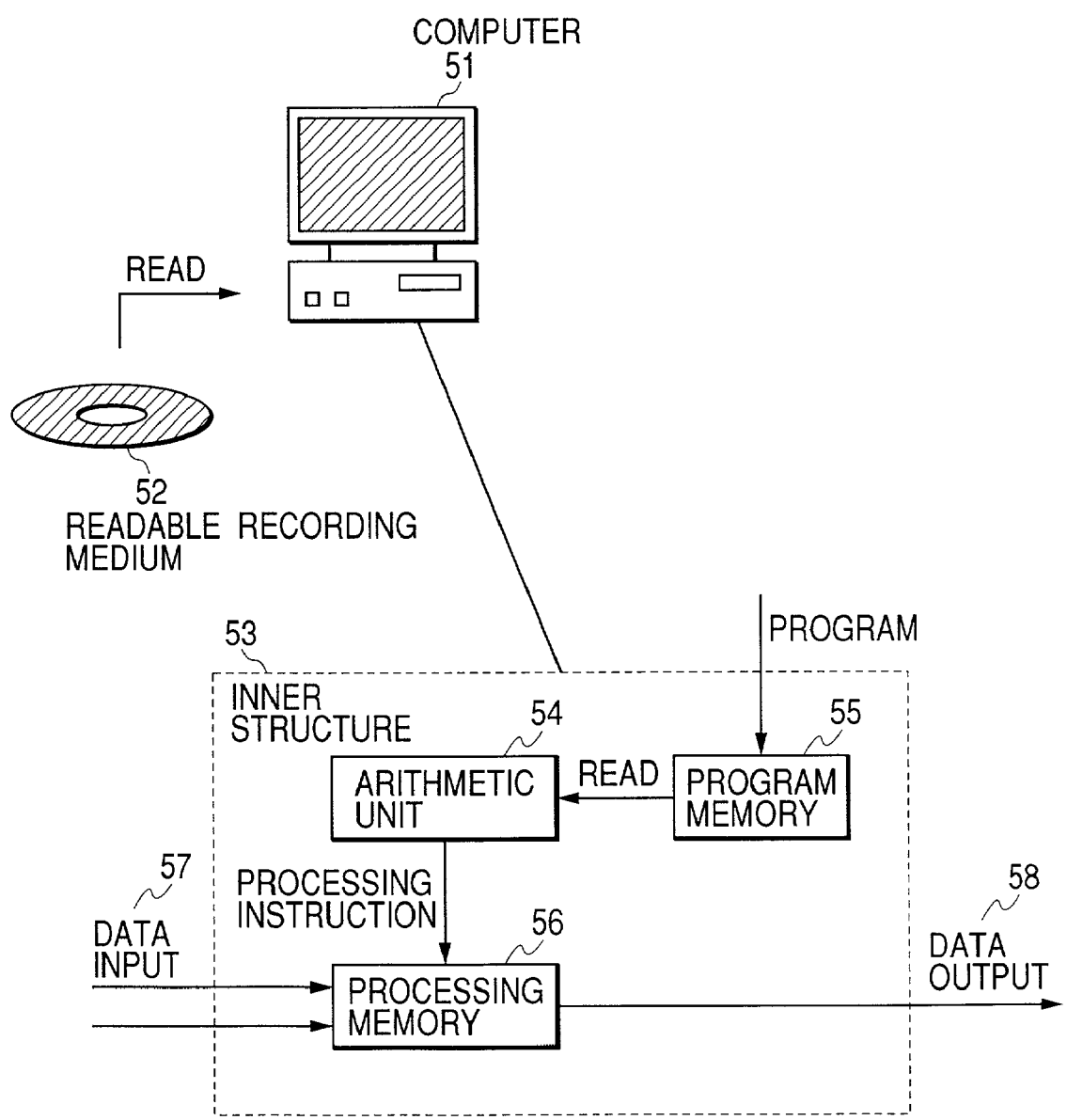
FIG. 5 is a structural diagram of one embodiment of a data recording apparatus according to the invention.

FIG. 5 is a diagram showing the structure of one embodiment of a data recording apparatus according to the invention. The embodiment uses a computer to execute the data multiplexing method of the invention and record a multiplexed data stream on a recording medium.

A computer 5 has an inner structure 53 which reads a data stream from a readable recording medium 52 and executes the data multiplexing method of the invention to acquire a data output 58 which is multiplexed data. The inner structure 53 has a program memory 55 in which a program for executing the data multiplexing method of the invention is loaded, and an arithmetic unit 54 which reads the program from the program memory 55, processes input data 57 stored in a processing memory 56 according to the program and outputs the output data 58. Those memories 55 and 56 are classified and used according to their functions. The memories 55 and 56 may be provided on a same memory.

Figure 6:
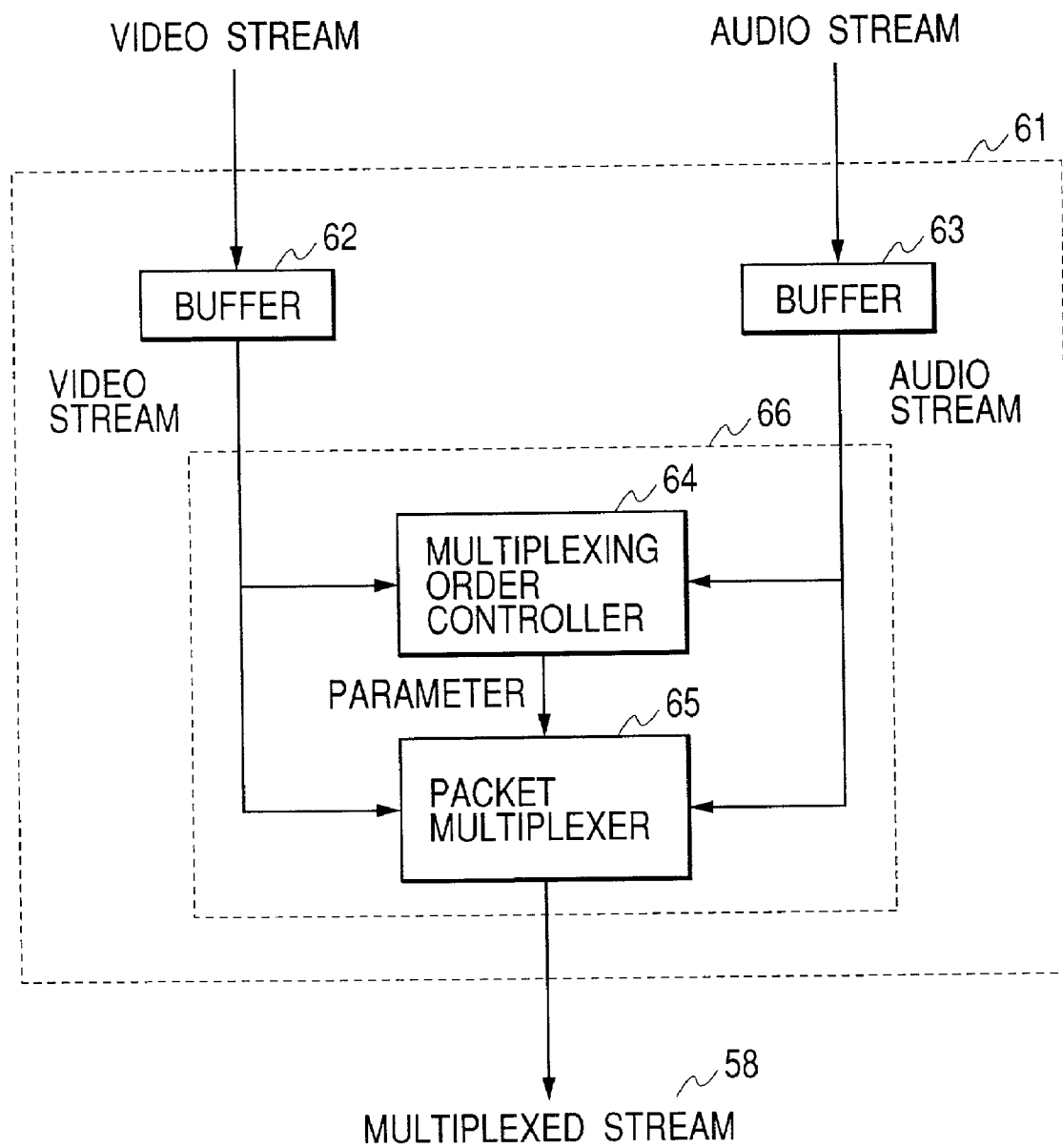
FIG. 6 shows the functional structure of that portion in an inner structure 53 in FIG. 5 which generates a multiplexed stream according to the invention.

FIG. 6 shows the functional structure of that portion in the inner structure 53 which generates a multiplexed stream according to the invention.

Referring to the figure, first, the input data 57 of a video stream and audio stream is inputted to the inner structure 53. With regard to the input to the data multiplexing apparatus, a video stream may be a video stream of video signals provided by a coding apparatus or a video stream extracted from a conventional multiplexed stream. An audio stream may be an audio stream of audio signals provided by the coding apparatus or an audio stream extracted from a conventional multiplexed stream. One example of a video stream is an ES of MPEG-2. One example of an audio stream is an ES of MPEG-1 Audio or an ES of linear PCM. The video stream and audio stream are consecutively stored in buffers 62 and 63, respectively.

A multiplexing order controller 64 accesses the video stream and audio stream stored in the buffers 62 and 63, analyzes the video stream and audio stream and outputs information on the order of multiplexing packets and parameters. The multiplexing order controller 64 detects a picture and AAU, acquires parameter information of video and audio streams, determines a data division position and calculates a multiplexing timing. The computation of the multiplexing timing is carried out by comparing the playback time of a picture with the playback time of an AAU and determining the multiplexing timing in such a way that the difference of playback start time between the first video frame and audio frame of a VOBU becomes equal to or smaller than an integer multiple of the duration time of reproduction of an AAU so that the difference becomes sufficiently small. The multiplexing timing is recorded in a header of a packet as SCR.

The multiplexing order controller 64 outputs parameters, such as the computed multiplexing timing, the order of multiplexing packets, playback time information and data block division position. The details of the data multiplexing method will be discussed later.

A packet multiplexer 65 receives video packet data and audio packet data from the buffers 62 and 63 and parameters from the multiplexing order controller 64. The packet multiplexer 65 divides the input video stream and audio stream into data blocks according to the input parameters, and stores parameter information in packet headers to produce video and audio packets. Recorded in the packet header are multiplexing timing information, such as SCR, and time stamp information, such as PTS and DTS. The produced packets are multiplexed according to the determined packet order and a multiplexed stream 58 is outputted. If necessary, a packet indicating the head or the like of a VOBU is prepared and inserted in the multiplexed stream. Further, a buffer apparatus may be provided to buffer the multiplexed stream VOBU by VOBU. Accordingly, a stream which completely ends at the end of a VOBU can always be outputted by discarding a multiplexed stream which has not reached the VOBU boundary in such a case where a video input stream ends at a midway of a GOP.

Although the foregoing description has separately discussed the multiplexing order controller 64 and the packet multiplexer 65 in order to clarify their functions, those two components may be put together into a packet output device 66. The multiplexing order controller 64 may be designed to produce packets and the packet multiplexer 65 may be designed to only output a multiplexed stream.

Figure 7:
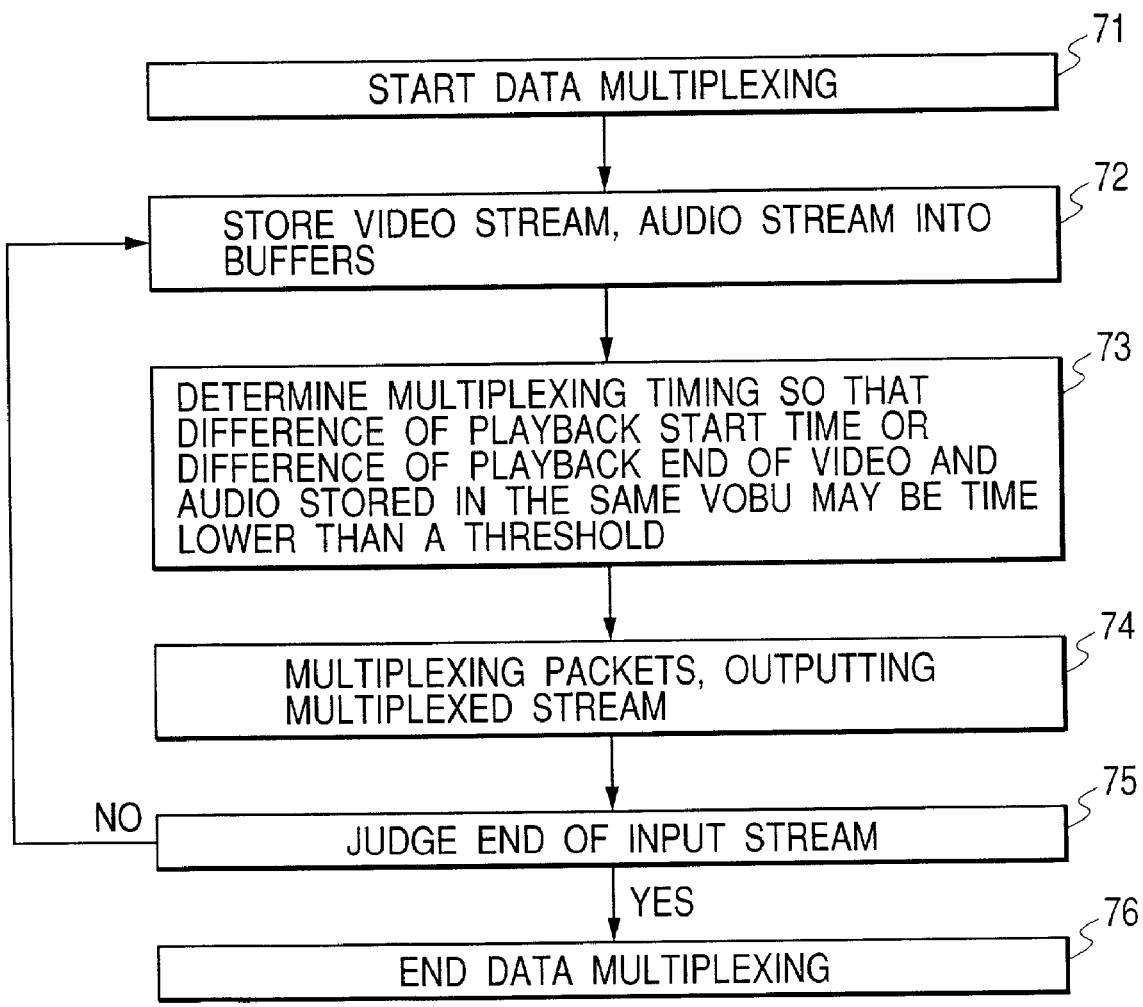
FIG. 7 is a flowchart of processing steps of the data multiplexing method according to the invention.

FIG. 7 shows a flowchart of processing steps of the data multiplexing method according to the invention.

A data multiplexing process is initiated (step 71), and a video stream and audio stream are respectively stored in the buffers 62 and 63 (step 72). The video stream and audio stream stored in the buffers 62 and 63 in step 72 are accessed, data is divided to produce packets and the multiplexing timings of the packets are calculated to determine the multiplexing order (step 73). The playback time of a picture is compared with the playback time of an AAU and the multiplexing order of video packets and audio packets is determined in such a way that the difference of playback start time between the first video frame and audio frame of a VOBU becomes sufficiently small. The details of the scheme of determining the multiplexing timing will be discussed later with reference to FIG. 8.

The video packets and audio packets are multiplexed in accordance with the packet order determined in step 73 and a multiplexed stream is outputted (step 74). If necessary, a packet indicating the head or the like of a VOBU is prepared and inserted in the multiplexed stream. The multiplexed stream may be sent to the buffer VOBU by VOBU to be buffered. This can allow a stream which completely ends at the end of a VOBU to always be outputted by discarding a multiplexed stream which has not reached the VOBU boundary in such a case where a video input stream ends at a midway of a GOP.

In step 75, the end of the input stream is determined. In case where the multiplexed stream is to be kept outputted, the flow returns to step 72. In case where the output of the multiplexed stream is to be ended, the flow proceeds to step 76. The output of the multiplexed stream is ended when, for example, an input of the video or audio stream ends. In case of buffering data, processing of data in the buffer which has not ended at the end of a VOBU is executed. In step 76, data multiplexing is ended. Through the above-described steps, the data multiplexing process is carried out.

Figure 8:
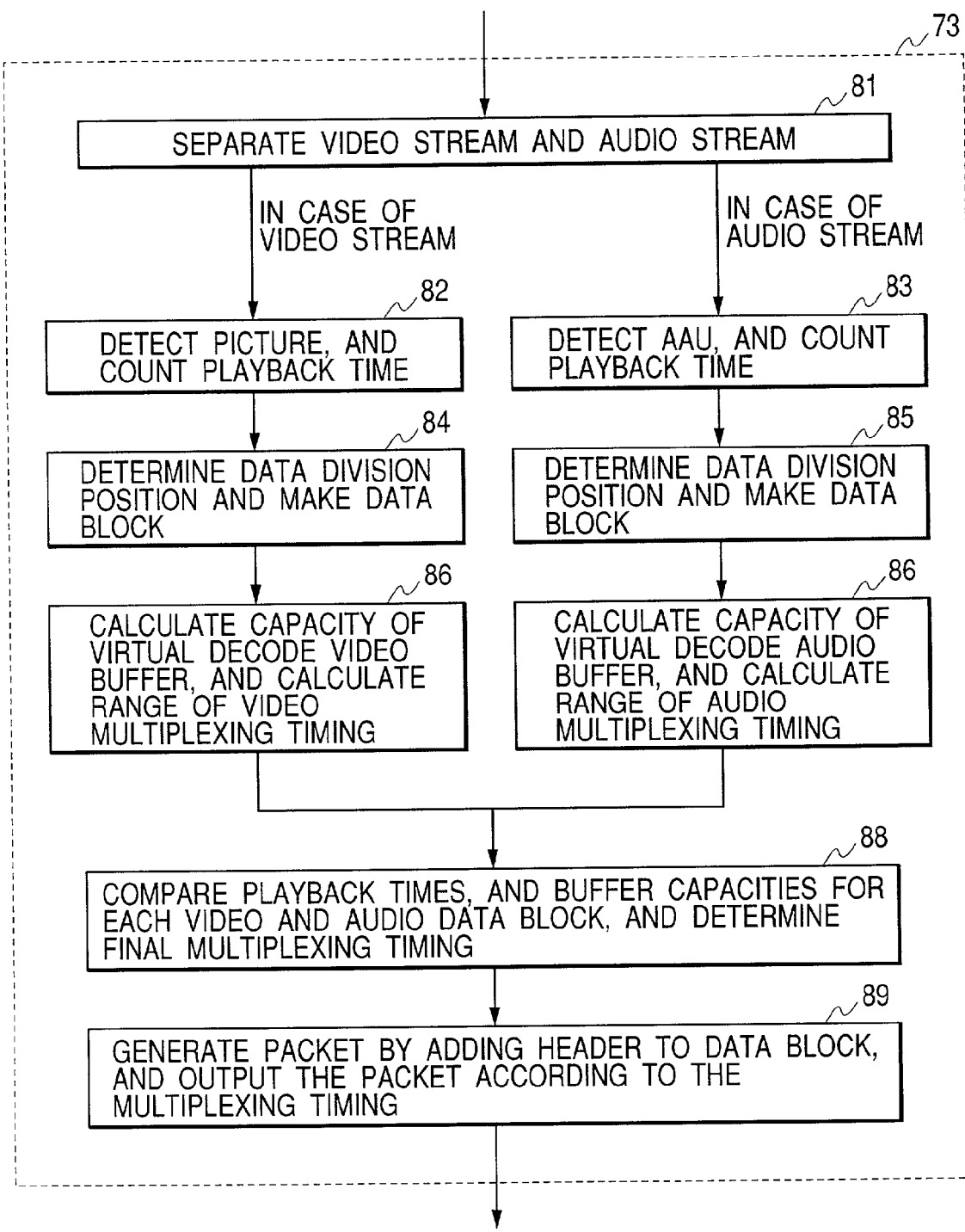
FIG. 8 is a processing flowchart specifically illustrating step 73 in FIG. 7.

FIG. 8 shows step 73 in FIG. 7 in detail and presents a processing flowchart for calculating the multiplexing timing for a video packet and an audio packet and producing packets.

The process of step 73 is initiated and is branched into two depending on whether the input stream is a video stream or an audio stream (step 81). When the input stream is a video stream, the flow proceeds to step 82, whereas when the input stream is an audio stream, the flow proceeds to step 83.

In step 82, information about pictures or the like in the video stream is detected and information on the playback time of each picture is computed. The positions of a picture header and a sequence header are detected from the video stream stored in the buffer, information on the resolution, the bit rate and the like of the input stream is acquired and the VOBU boundary is determined. For example, setting is done in such a way that VOBUs are separated at the boundary of GOPs of MPEG-2. For an encoder for which a sequence header is inserted GOP by GOP, the sequence header is detected from the video stream and the head of the sequence header is set as the VOBU boundary. The playback time of each picture is calculated from information on the reproducing order of the picture that is recorded in the picture header.

In step 83, information about AAUs or the like in the audio stream is detected, information on the bit rate or the like of the input stream is acquired, and information on the playback time of each AAU is computed. The flow then proceeds to step 85.

In step 84, the data division positions of the video stream are determined. Specifically, the data division positions of the video stream are determined from a predetermined size of video packets. The video stream is divided into packets in such a way that pictures are not arranged over a plurality of VOBUs. According to the DVD standard, for example, the size of video packets is defined in such a way that the pack size of the MPEG-2 PS becomes 2048 bytes. Data is divided in such a way that data of different GOPs are not included in the same packet. In case of setting a constant packet size, for example, data should be divided by a given length for areas other than the GOP boundary and padding data is inserted to supplement any insufficient part of the packet size in the vicinity of the boundary. Then, the flow proceeds to step 86.

In step 85, the data division positions of the audio stream are determined. Specifically, the data division positions of the audio stream are determined from a predetermined size of audio packets. The audio stream is divided into packets in such a way that AAUs are not arranged over a plurality of VOBUs. According to the DVD standard, for example, the size of audio packets is defined in such a way that the pack size of the MPEG-2 PS becomes 2048 bytes. Division may be executed so that one AAU is included in one packet or a plurality of AAUs are included in one packet. Then, the flow proceeds to step 87.

In step 86, with regard to each data block whose division position has been specified in step 84, the capacity of a virtual video buffer is calculated and the range of video multiplexing timing is calculated. The virtual video buffer stores video data in a decoder model, which will be discussed later. In case of generating a multiplexed stream, the target buffer size of the decoder is preset. According to the DVD standard, for example, the size of the video buffer is defined to be 232 Kbytes. The size of the virtual video buffer is computed in such a way as not to cause overflow or underflow of the predetermined size of the video buffer, and the range of multiplexing timing that can allow each data block to be inputted into the buffer is computed. The calculation is performed on the assumption that the virtual buffer receives data, data block by data block, in accordance with the multiplexing timing and outputs data picture by picture in accordance with the playback time. If the input time becomes earlier, there is a possibility of causing overflow, whereas if the input time is delayed, there is a possibility of causing underflow. From the playback time of each picture and the operation of the virtual buffer, the range of multiplexing timing for each data block is determined. A scheme of computing the multiplexing timing will be discussed later. The flow then proceeds to step 88.

In step 87, with regard to each data block whose division position has been specified in step 85, the capacity of a virtual audio buffer is calculated and the range of audio multiplexing timing is calculated. The virtual audio buffer stores audio data in a decoder model, which will be discussed later. In case of generating a multiplexed stream, the target buffer size of the decoder is preset. According to the DVD standard, for example, the size of the audio buffer is defined to be 4 Kbytes. It is to be noted however that the value of 4 K is given for the conventional stream and a larger value is defined previously in order to generate a stream which has the characteristic of the invention. The size of the virtual audio buffer is computed in such a way as not to cause overflow or underflow of the predetermined size of the audio buffer, and the range of multiplexing timing that can allow each data block to be inputted into the buffer is computed. The calculation is performed on the assumption that the virtual buffer receives data, data block by data block, in accordance with the multiplexing timing and outputs data AAU by AAU in accordance with the playback time. If the input time becomes earlier, overflow may occur, whereas if the input time is delayed, underflow may occur. From the playback time of each AAU and the operation of the virtual buffer, the range of multiplexing timing for each data block is determined. A scheme of computing the multiplexing timing will be discussed later. The flow then proceeds to step 88.

In step 88, the playback times of pictures and AAUs included in video and audio data blocks to be outputted next are compared with the ranges of multiplexing timing computed in steps 86 and 87 to thereby calculate the multiplexing order of video packets and audio packets and SCR which is the final multiplexing timing. The playback time of a picture is compared with the playback time of an AAU and the multiplexing timing is determined in such a manner that the difference of playback start time between the first video frame and audio frame of a VOBU becomes sufficiently small. The scheme of determining the multiplexing timing will be discussed later.

In step 89, the video stream and audio stream are divided in accordance with the data block division positions that have been determined in steps 84 and 85, yielding data blocks, parameter information, such as time stamps or playback time information and SCR that is information of multiplexing timing determined in step 88, is stored in the packet headers, and the data blocks are combined to produce packets. The packets and headers have already described. Through the above-described steps, packetization of a video stream and audio stream is carried out.

Figure 9:
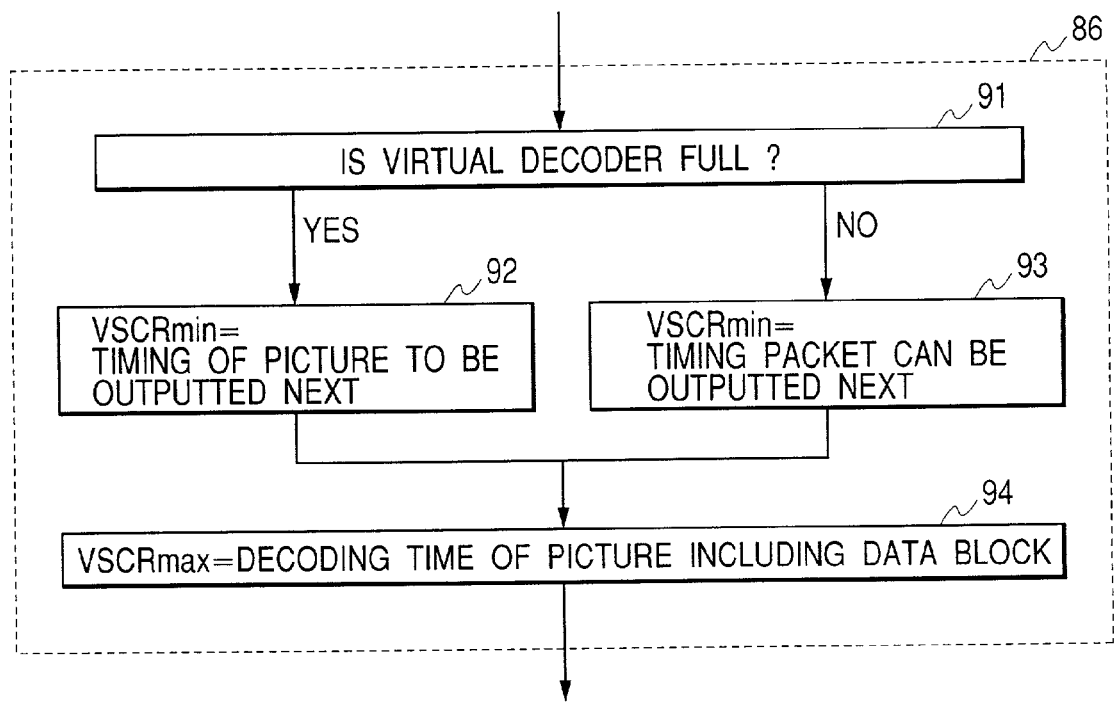
FIG. 9 is a processing flowchart specifically illustrating step 86 in FIG. 8.

FIG. 9 specifically illustrates step 86 in FIG. 8 and presents a processing flowchart for performing calculation on the video buffer and computing the range of multiplexing timing.

The process is initiated (step 91) and is branched into two depending on whether or not the virtual video buffer in the decoder model (which will be elaborated later) is full of data. The calculation is performed on the assumption that the virtual video buffer receives data, data block by data block, in accordance with the multiplexing timing and outputs data picture by picture in accordance with the playback time.

With respect to the input steam, the last SCR of the data packetized and outputted so far is set to SCRtmp. That is, the timing of a picture to be outputted next is SCRtmp. With regard to a data block to be packetized next, if data cannot be inputted to the virtual video buffer at the timing SCRtmp (the buffer is full), the flow proceeds to step 92, and if data can be inputted to the virtual video buffer (the buffer is not full), the flow proceeds to step 93.

In step 92, VSCRmin or the minimum timing for inputting a video packet in the buffer is determined. That is, as it is determined in step 91 that the virtual video buffer is currently full, the timing of a picture to be outputted next from the buffer is set as VSCRmin. This VSCRmin corresponds to decoding management information DTS of a picture to be outputted next from the virtual buffer. For B-pictures in MPEG-2, DTS=PTS. The flow then proceeds to step 94.

In step 93, VSCRmin or the minimum timing for inputting a video packet in the buffer is determined. As it is determined in step 91 that the virtual video buffer is not full at present, the timing SCRtmp of a packet to be outputted next is set as VSCRmin. Then, the flow proceeds to step 94.

In step 94, VSCRmax or the maximum timing for inputting a video packet into the buffer is determined. Inputting of a video data block into the buffer should be completed before a picture of that data block is outputted from the decoder. Therefore, the decoding timing of a picture included in this data block is set as VSCRmax. Note that in case where overhead occurs at the time of inputting a packet into the buffer, that overhead should be taken into consideration. The range of multiplexing timing is calculated in the above-described manner.

Figure 10:
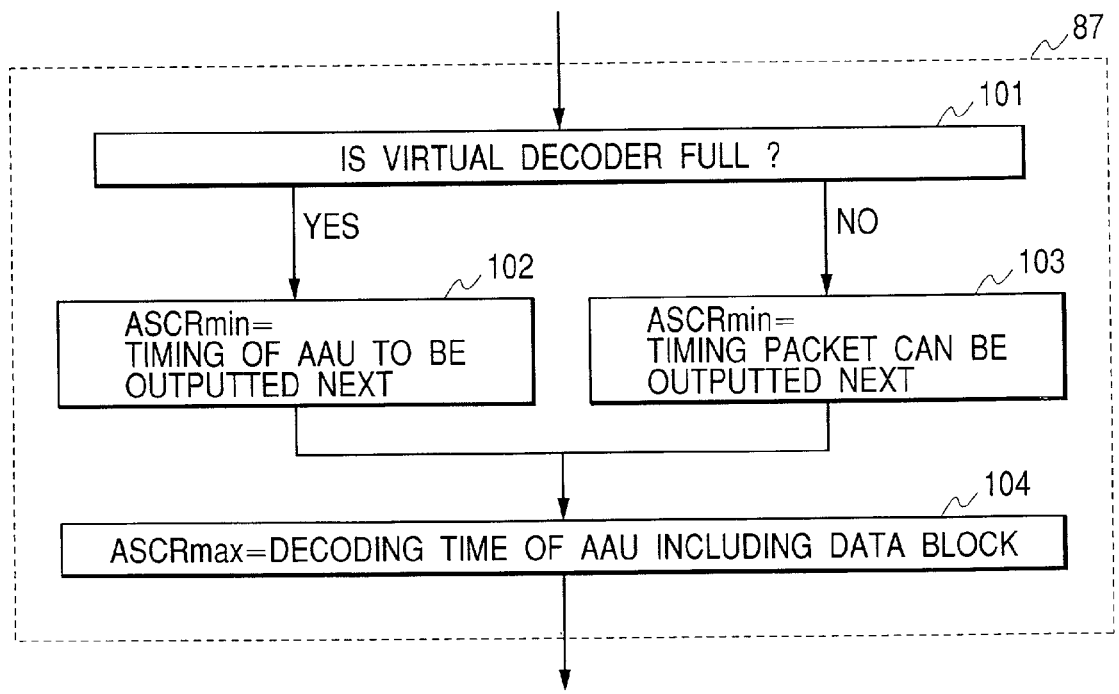
FIG. 10 is a processing flowchart specifically illustrating step 87 in FIG. 8.

FIG. 10 specifically illustrates step 87 in FIG. 8 and presents a processing flowchart which performs calculation on the virtual audio buffer and calculates the range of audio multiplexing timing.

The process is initiated (step 101) and is branched into two depending on whether or not the virtual audio buffer in the decoder model is full of data. The calculation is performed on the assumption that the virtual audio buffer receives data, data block by data block, in accordance with the multiplexing timing and outputs data AAU by AAU in accordance with the playback time. With respect to the input steam, the last SCR of the data packetized and outputted so far is set to SCRtmp. That is, the timing of a picture to be outputted next is SCRtmp. With regard to a data block to be packetized next, if data cannot be inputted to the virtual audio buffer at the timing SCRtmp (the buffer is full), the flow proceeds to step 102, and if data can be inputted to the virtual audio buffer (the buffer is not full), the flow proceeds to step 103.

In step 102, ASCRmin or the minimum timing for inputting an audio packet in the buffer is determined. That is, as it is determined in step 101 that the virtual audio buffer is currently full, the timing of a picture to be outputted next from the buffer is set as ASCRmin. This ASCRmin corresponds to PTS of an AAU to be outputted next from the virtual buffer. The flow then proceeds to step 104.

In step 103, ASCRmin or the minimum timing for inputting an audio packet in the buffer is determined. As it is determined in step 101 that the virtual audio buffer is not full at present, the timing SCRtmp of a packet to be outputted next is set as ASCRmin. Then, the flow proceeds to step 104.

In step 104, ASCRmax or the maximum timing for inputting an audio packet into the buffer is determined. Inputting of an audio data block into the buffer should be completed before a picture of that data block is outputted from the decoder. Therefore, the decoding timing of an AAU included in this data block is set as ASCRmax. In case where a plurality of AAU are included in a data block, ASCRmax would be the decoding timing of the top AAU. Note that in case where overhead occurs at the time of inputting a packet into the buffer, that overhead should be taken into consideration. The range of multiplexing timing is calculated in the above-described manner.

Figure 11:
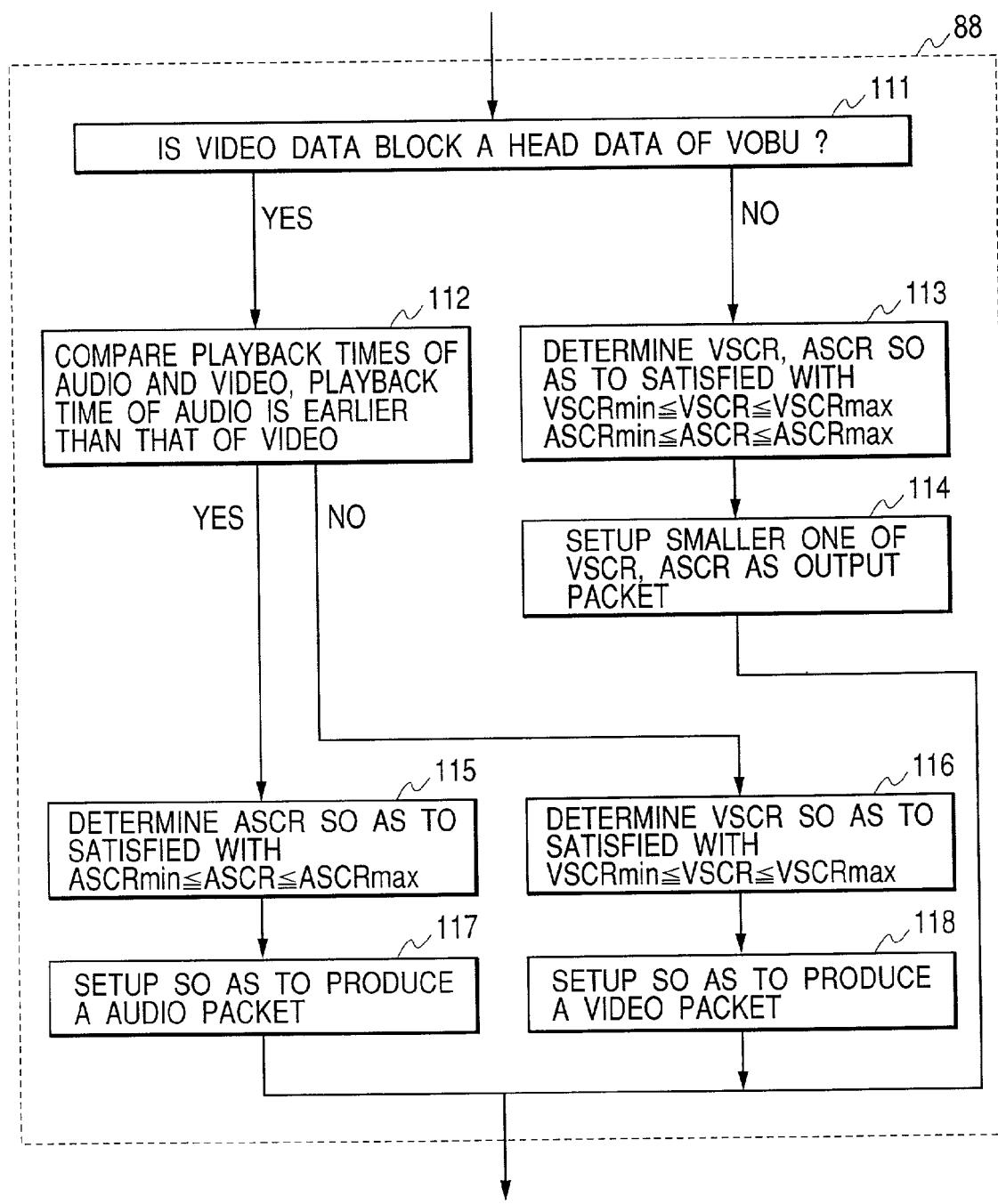
FIG. 11 is a processing flowchart specifically illustrating step 88 in FIG. 8.

FIG. 11 specifically illustrates step 88 in FIG. 8 and presents a processing flowchart for determining the multiplexing timing.

The process is initiated and it is determined whether or not a video data block to be outputted next is the head data of a VOBU (step 111). When the data block is head data of the VOBU, the flow proceeds to step 112, and when it is not, the flow proceeds to step 113. In case where multiplexing is carried out with one GOP corresponding to one VOBU, the head of the sequence header is extracted as the head of a data block at the time of producing the data block, on the assumption that the sequence header is included in the head of each GOP, and the data block is determined as the head of the VOBU when it is processed.

In step 112, the playback time of a picture including a video data block is compared with the playback time of an AAU including an audio data block and the flow is branched based on the comparison result. When a plurality of AAUs are included in a data block, a decision is made on an AAU which includes the head data of the data block. When the playback time of audio is earlier, the flow proceeds to step 115, whereas when the playback time of video is earlier, the flow proceeds to step 116.

In step 113, VSCR and ASCR that satisfy the conditions of VSCRmin≦VSCR≦VSCRmax and ASCRmin≦ASCR≦ASCRmax from the aforementioned VSCRmin, VSCRmax, ASCRmin and ASCRmax for each of a video data block and an audio data block. For example, VSCR and ASCR are determined in such a way as to be independent and given time durations and are adjusted in such a way that VSCR=ASCR+SCR_TM when ASCR≦VSCR<ASCR+SCR_TM where SCR_TM is the time duration for one packet to be read into the buffer. Further, with ASCR=ASCRmin and VSCR=VSCRmin, when ASCR≦VSCR<ASCR+SCR_TM, VSCR and ASCR are adjusted in such a way that VSCR=ASCR+SCR_TM, or when VSCR≦ASCR<VSCR+SCR_TM, VSCR and ASCR are adjusted in such a way that ASCR=VSCR+SCR_TM. Then, the flow proceeds to step 114.

In step 114, VSCR of the video data block and ASCR of the audio data block which have been set in step 113 are compared with each other, and the data block that has a smaller one of VSCR and ASCR is set as a packet to be outputted next. After step 114, step 88 is terminated.

In step 115, ASCR is determined in such a way as to satisfy the condition ASCRmin≦ASCR≦ASCRmax. For example, ASCR is so determined as to be a given duration. Alternatively, ASCR is so determined as to always be ASCR=ASCRmin. Because the video data block to be outputted next becomes the head of the succeeding VOBU, the audio data block included in the preceding VOBU is outputted. The flow then proceeds to step 117.

In step 116, VSCR is determined in such a way as to satisfy the condition VSCRmin≦VSCR≦VSCRmax. For example, VSCR is so determined as to be a given duration. Alternatively, VSCR is so determined as to always be VSCR=VSCRmin. This data block becomes the head of the VOBU. The flow then proceeds to step 118.

In step 117, the audio data block is set as a packet to be outputted next after which step 88 is terminated.

In step 118, the video data block is set as a packet to be outputted next after which step 88 is terminated. The multiplexing timing of a packet is determined in the above-described manner.

Figure 12:
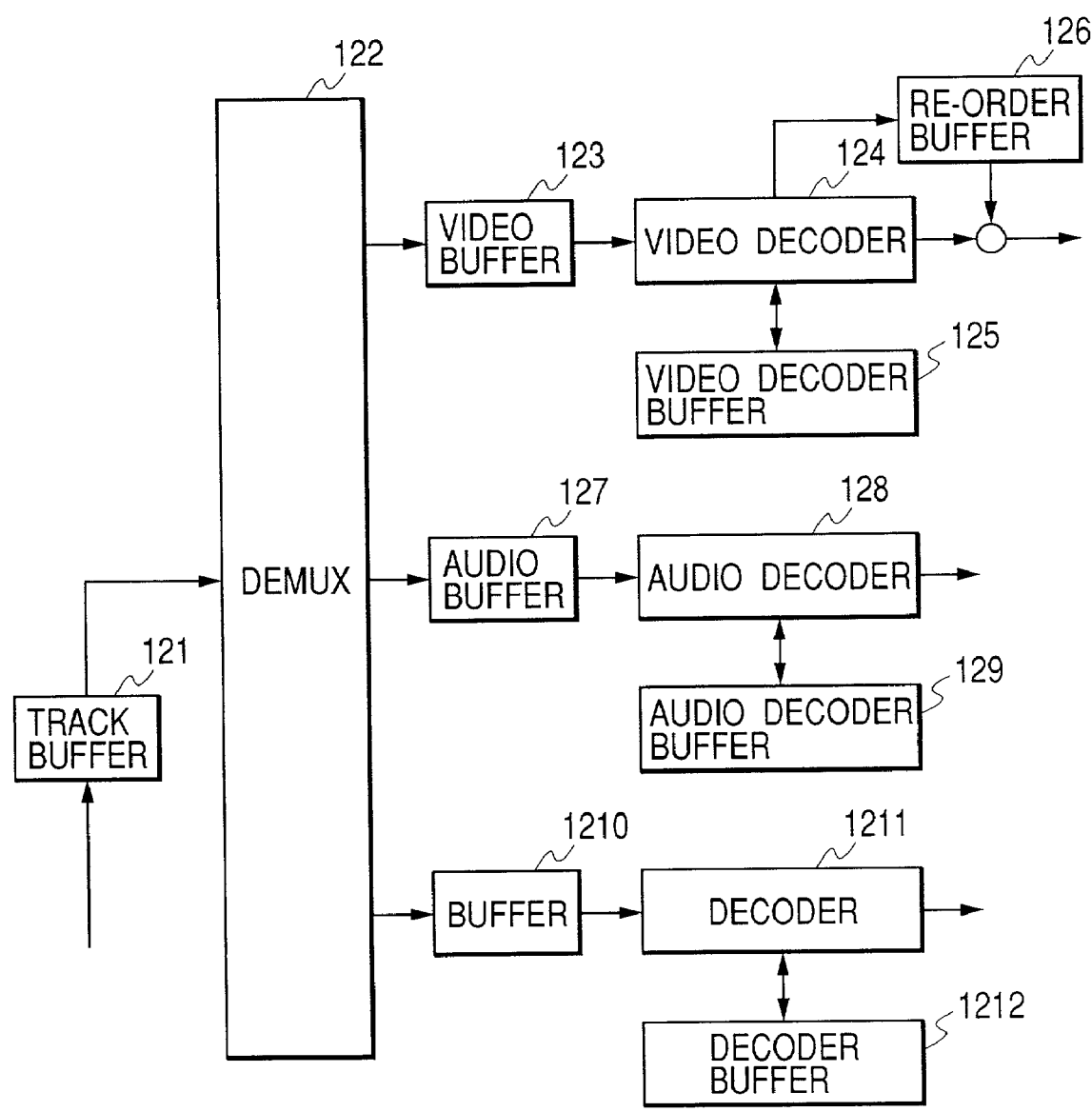
FIG. 12 is a structural diagram of one embodiment of a decoder according to the invention.

FIG. 12 shows the structures of the essential portions of one embodiment of a decoder according to the invention.

The illustrated decoder model is defined as a P-STD (Program Stream-System Target Decoder)and T-STD (Transport Stream-System Target Decoder) in the MPEG-2 standard or the like. An encoder and multiplexer perform encoding and multiplexing in such a way that buffers in the decoder model, such as a video buffer and audio buffer, do not overflow or underflow.

A multiplexed stream is sent to a demultiplexer 122 from a track buffer 121 where the multiplexed stream is stored. Multiplexed packets are separated into video data, audio data and other data, which are respectively sent to and stored in a video buffer 123, an audio buffer 127 and a buffer 1210. Packet data is sent to each of the video buffer 123, the audio buffer 127 and the buffer 1210 in accordance with the buffer read timing SCR recorded in the packet header.

With regard to a video packet, data is sent to a video decoder 124 from the video buffer 123 picture by picture in accordance with the decoding time stamp (DTS). The data is temporarily stored in a video decoder buffer 125 and is decoded by the decoder 124 so that a video signal is outputted and displayed. In MPEG-2 or the like, DTS or the picture decoding timing differs from a presentation time stamp (PTS) or the display timing between an I-picture and a P-picture due to motion estimation. Therefore, decoded data is stored in a re-order buffer 126.

With regard to an audio packet, data is sent to an audio decoder 128 from the audio buffer 127 AAU by AAU in accordance with PTS. The data is temporarily stored in an audio decoder buffer 129 and is decoded by the decoder 128 so that an audio signal is outputted and displayed.

Other data is sent to a decoder 1211 from the buffer 1210 and temporarily stored in a decoder buffer 1212. The data is decoded and reproduced. Other data includes superimposition information, such as sub pictures, and simple video information.

While the general structure of the decoder is the same as that of the conventional decoder, the decoder that decodes a multiplexed stream which is generated by the invention differs from the conventional decoder in the structure of the audio buffer 127. Given that the maximum value of VBVdelay in a video stream is VBVdelay_max, the maximum bit rate of an audio stream is Ra_max and the duration time of reproduction of one frame of the video stream is Frm_TM, the size Sab of the audio buffer 127 of the decoder is designed as to be expressed by an equation 3 below.

$$Sab \geq (VBVdelay\_max + Frm\_TM) \times Ra\_max \quad (3)$$

VBVdelay is a value indicating the delay time of a picture in a video stream with respect to a VBV (Video Buffering Verifier) buffer as defined in the MPEG-2 standard or the like. VBVdelay will be discussed later. The value of VBVdelay_max in the equation 3 may be the maximum value of VBVdelay to which an overhead time for reading a video stream into the video buffer, such as a sequence header, is added.

Figure 13:
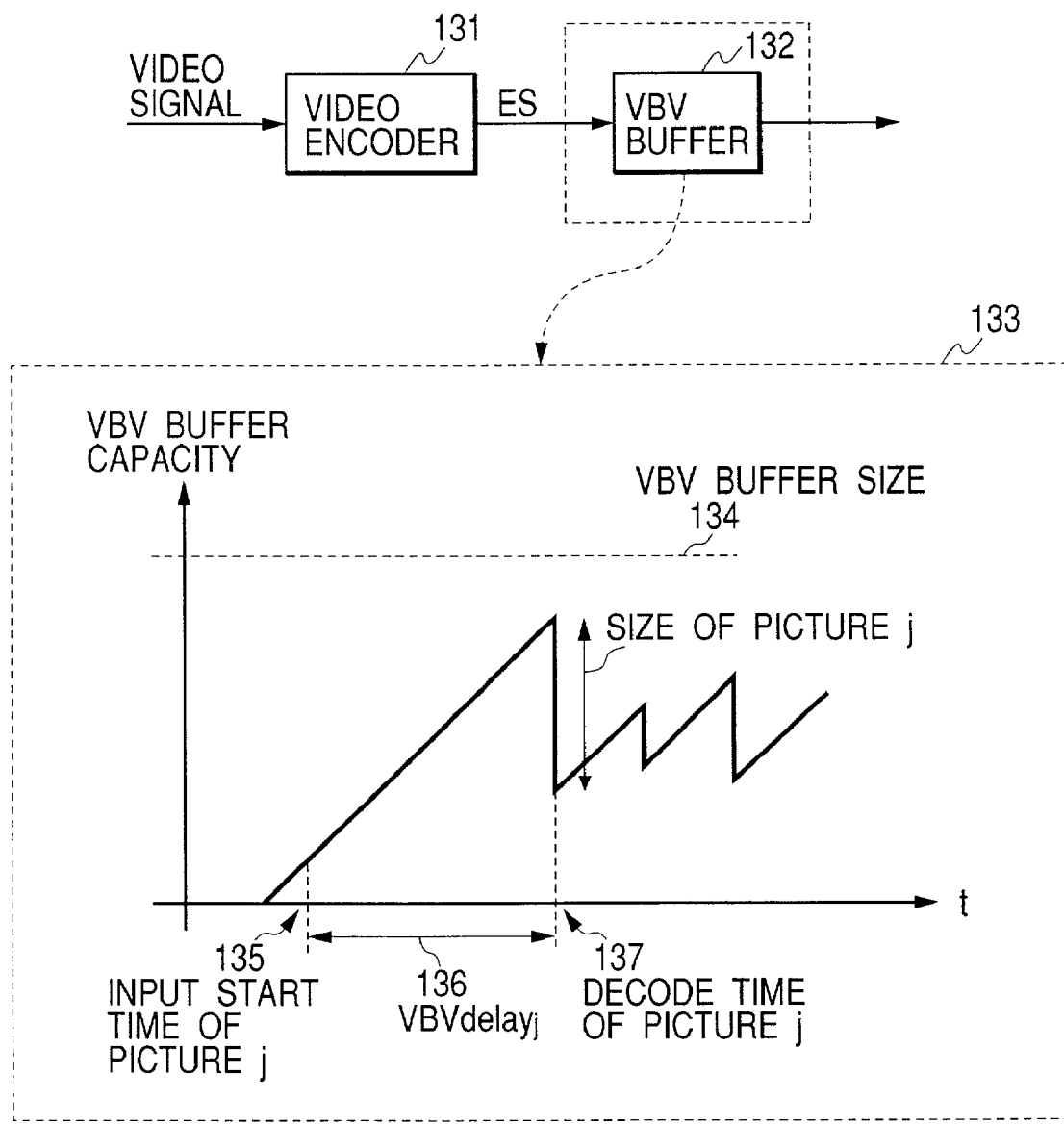
FIG. 13 is a diagram for explaining VBVdelay of a VBV buffer.

FIG. 13 is a diagram for explaining VBVdelay.

An MPEG-2 encoder is illustrated as one example. A video stream encoder 131 receives a video signal, encodes the video signal and outputs an ES. At this time, it is necessary to consider a VBV buffer model in which a virtual buffer 132 called a VBV buffer is connected to the encoder 131 and control buffering in such a way that the video stream ES does not overflow or underflow the VBV buffer 132. A graph 133 shows a change in the occupying time of the VBV buffer 132. The vertical axis of the graph represents the capacity of the VBV buffer 132 and the horizontal axis represents the time. The size 134 of the VBV buffer 132 is determined by the standard of MPEG-2 or the like. A VBVdelay value 136 of one picture is the duration time from a time 135 to start inputting in the buffer to a decoding time 137 at which the picture is outputted from the buffer. VBVdelay is determined in such a way that the VBV buffer 132 does not always overflow or underflow for each picture. VBVdelay is recorded in a video stream and supplied to the decoder in this form. Because multiplexed data that is prepared by the data multiplexing method of the invention of the invention is multiplexed while synchronizing a video stream with an audio stream, it is necessary to buffer audio data on the decoder side for the total time of the VBVdelay value of one picture plus the duration time of one frame. The relationship is given by an equation 4. Specifically, the maximum value, VBVSize_max, of the VBV buffer size is determined in such a way that VBVdelay_max which differs depending on a stream becomes:

$$VBVdelay\_max \leq VBVSize\_max / Rv\_max \quad (4)$$

where Rv_max is the maximum bit rate of video.

Figure 14:
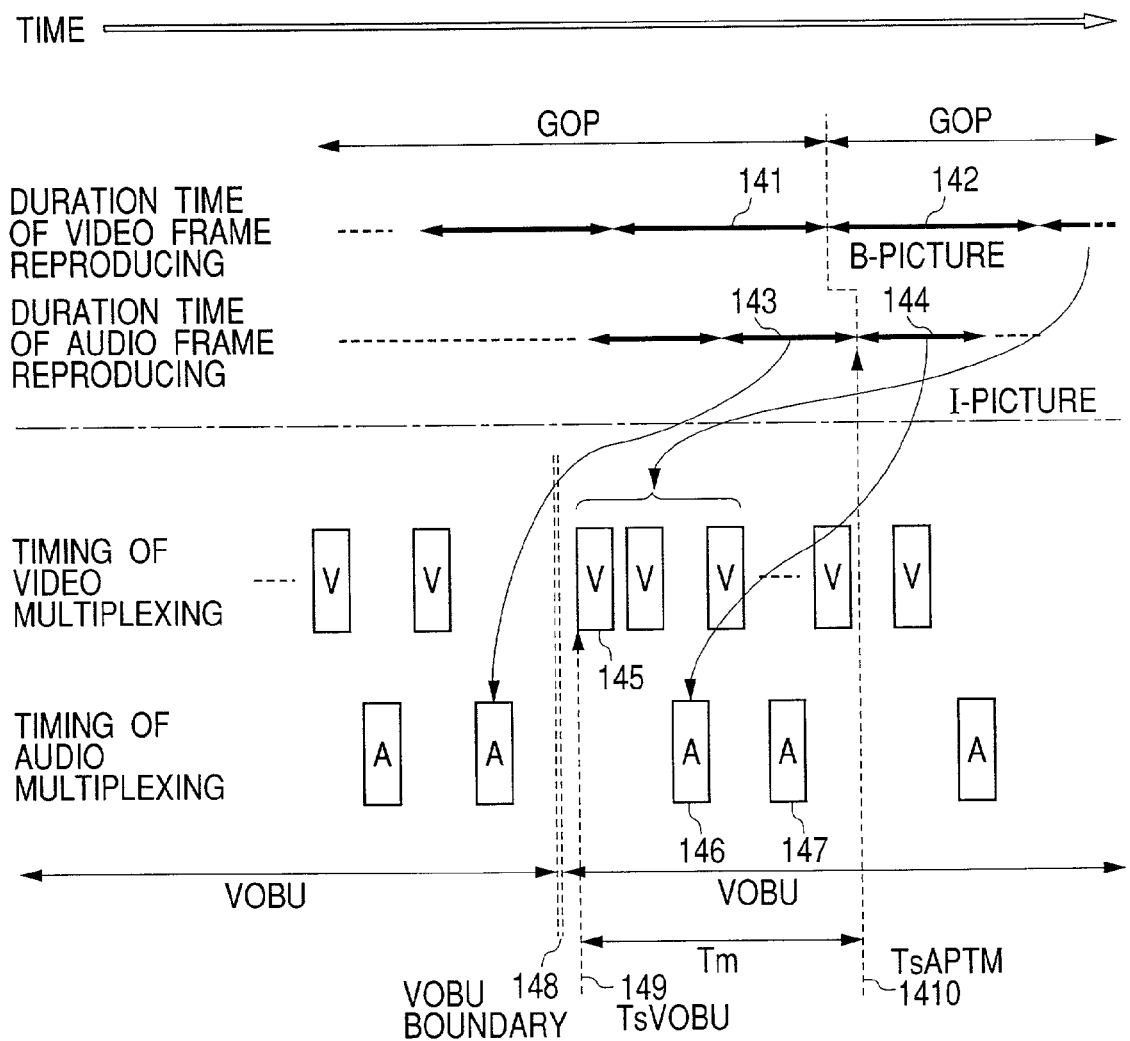
FIG. 14 is a timing chart for explaining the operation of the decoder according to the invention.

FIG. 14 is a timing chart for explaining the operation of the decoder according to the invention. In FIG. 14, the playback times of a video frame and an audio frame and the multiplexing timing for an audio packet are arranged on the same time axis. The boundary between video frames 141 and 142 is a GOP boundary and the boundary between an audio frame 144 whose playback start time is closest to that of the first video frame 142 of a succeeding GOP and an audio frame 143 which comes directly before the audio frame 144 is a VOBU boundary. As this multiplexed stream is packetized and multiplexed by using the data multiplexing method of the invention of the invention, video data and audio data that are to be reproduced within a given time range are multiplexed in the same VOBU. In FIG. 14, from the relationship between the reproducing order of I-pictures and the reproducing order of B-pictures, a video packet 145 is the first video packet of a succeeding VOBU and an audio packet 146 is the first audio packet of the succeeding VOBU. A position 148 is the VOBU boundary.

The required size of the audio buffer of the decoder is the amount of audio data that is included between $T_S$VOBU (149) or the time to read the head packet of the VOBU and $T_S$APTM (1410) or the playback start time for audio data in the VOBU. Given that the bit rate of audio is Ra and the difference between $T_S$VOBU and $T_S$APTM is Tm, the audio buffer size Sab should satisfy an equation 5.

$$Sab \geq (T_S APTM - T_S VOBU) \times Ra$$

or $$Sab \geq Tm \times Ra \quad (5)$$

If the length of the difference Tm, which differs from one VOBU to another, is described as the relationship between video and audio over the entire stream, Tm≦VBVdelay_max+Frm_TM. Therefore, the equation 5 is derived. As the audio buffer size is determined in the above-described manner and the decoder is designed based on the audio buffer size, the decoder that can reproduce a multiplexed stream generated by the data multiplexing method of the invention of the invention can be provided.

Although the foregoing description of the embodiment has discussed the MPEG-2 standard or the like, the invention is not limited to this particular type. The above-described problems may arise in an ordinary data encoding process that performs packetization and multiplexing, and the invention can be adapted to other encoding processes than has already been discussed. For example, the invention may be adapted to the MPEG-4 standard. It is also possible to transfer packetized data that has been generated by the method of the invention by using communication means.

Various other modification will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data multiplexing method comprising the steps of:
   storing a video stream and an audio stream in first and second buffers, respectively;
   comparing said video stream and audio stream from said first and second buffers with each other to determine an order of packets and a parameter in such a way that in generation of a multiplexed stream to be outputted, a difference of playback start time or a difference of playback end time of video and audio to be recorded in a same video object unit becomes equal to or smaller than a threshold; and
   dividing said video stream and audio stream from said first and second buffers into data blocks in accordance with said parameter and adding headers to said data blocks to produce packets, multiplexing said packets and outputting a multiplexed stream.

2. A data recorded medium on which a multiplexed stream is recorded that includes a video stream and an audio stream and is acquired by dividing each of said video stream and said audio stream into data blocks, adding headers to said data blocks to produce packets and multiplexing said packets,
   said multiplexed stream being such that a difference of playback start time or a difference of playback end time of video and audio included in a specific one of video object units each having a series of packets including at least one group of pictures, which is a video encoding unit in said video stream, becomes equal to or smaller than a threshold.

3. The data recorded medium according to claim 1, wherein said threshold is an integer multiple of a duration time of reproduction of an audio access unit.

4. A data recorded medium on which a multiplexed stream is recorded that includes a video stream and an audio stream and is acquired by dividing each of said video stream and said audio stream into data blocks, adding headers to said data blocks to produce packets and multiplexing said packets and which is of a model that allows said multiplexed stream to be read in a buffer of a decoder packet by packet and to be outputted picture by picture and audio access unit by audio access unit in accordance with a playback time, wherein said multiplexed stream satisfies a condition of Tea≦Tsv where Tsv is a read start time of a head packet in a specific one of video object units each having a series of packets including at least one group of pictures, which is a video encoding unit in said video stream, and Tea is a read end time of a packet including data of a last portion of an audio access unit having a playback end time after but closest to a playback start time of video included in said specific video object unit or an audio access unit having a playback end time after but closest to that playback start time.

5. The data recorded medium according to claim 2, wherein said threshold is an integer multiple of a duration time of reproduction of said audio access unit.

6. A data recording apparatus for dividing each of a plurality of streams including a video stream and an audio stream into data blocks, adding headers to said data blocks to produce packets, multiplexing said packets and recording said multiplexed packets, comprising: first buffer means for storing said video stream; second buffer means for storing said audio stream; a control section for comparing said video stream from said first buffer means with said audio stream from said second buffer means to determine an order of packets and a parameter so that a difference of playback start time or a difference of playback end time of video and audio to be recorded in a same video object unit in a multiplexed stream to be outputted becomes equal to or smaller than a threshold and outputting said parameter; and a multiplexing section for dividing said video stream from said first buffer means and said audio stream from said second buffer means into data blocks in accordance with said parameter and adding headers to said data blocks to produce packets, multiplexing said packets and outputting a multiplexed stream.

7. The data recording apparatus according to claim 6, wherein said threshold is an integer multiple of a duration time of reproduction of an audio access unit.

8. A program for allowing a computer to execute procedures of dividing each of a plurality of streams including a video stream and an audio stream into data blocks, adding headers to said data blocks to produce packets, multiplexing said packets and recording said multiplexed packets, comprising: a first step of storing said video stream and said audio stream in buffers; a second step of comparing said video stream and audio stream read from said buffers with each other to determine a multiplexing timing so that a difference of playback start time or a difference of playback end time of video and audio to be recorded in a same video object unit in a multiplexed stream to be outputted becomes equal to or smaller than a threshold and outputting said parameter; and a third step of multiplexing video packets and audio packets in accordance with said multiplexing timing and outputting a multiplexed stream.

9. The program according to claim 8, wherein said threshold is an integer multiple of a duration time of reproduction of an audio access unit.

10. The program according to claim 8, wherein said second step includes:
- a fourth step of discriminating and separating said video stream and said audio stream;
- a fifth step of detecting a picture in said video stream and calculating a playback time;
- a sixth step of detecting an audio access unit of said audio stream and calculating a playback time;
- a seventh step of determining a data division position and making data blocks for said video stream;
- an eighth step of determining a data division position and making data blocks for said audio stream;
- a ninth step of calculating a capacity of a virtual video buffer for said video stream and calculating a range of a video multiplexing timing;
- a tenth step of calculating a capacity of a virtual audio buffer for said audio stream and calculating a range of an audio multiplexing timing;
- an eleventh step of determining final multiplexing timings for video and audio packets from said playback times and said capacities of said virtual buffers for said video stream and said audio stream; and
- a twelfth step of adding headers to said data blocks to produce packets and outputting said packets in accordance with said final multiplexing timings.

11. The program according to claim 10, wherein said threshold is an integer multiple of a duration time of reproduction of said audio access unit.

12. A decoder comprising:
- a demultiplexer for separating at least a video stream and an audio stream from a multiplexed stream including said video stream and said audio stream;
- a video decoding section for playing back video via a video buffer for buffering said separated video stream; and
- an audio decoding section for playing back audio via an audio buffer for buffering said separated audio stream,
- a capacity of said audio buffer being set equal to or larger than a value obtained by adding a maximum value of a delay time of a picture in said video stream in said multiplexed stream with respect to a video buffering verifier and a playback time of one frame of said video stream together and multiplying a resultant value by a maximum bit rate of said audio stream.

* * * * *